2,727,044
YELLOW PIGMENT

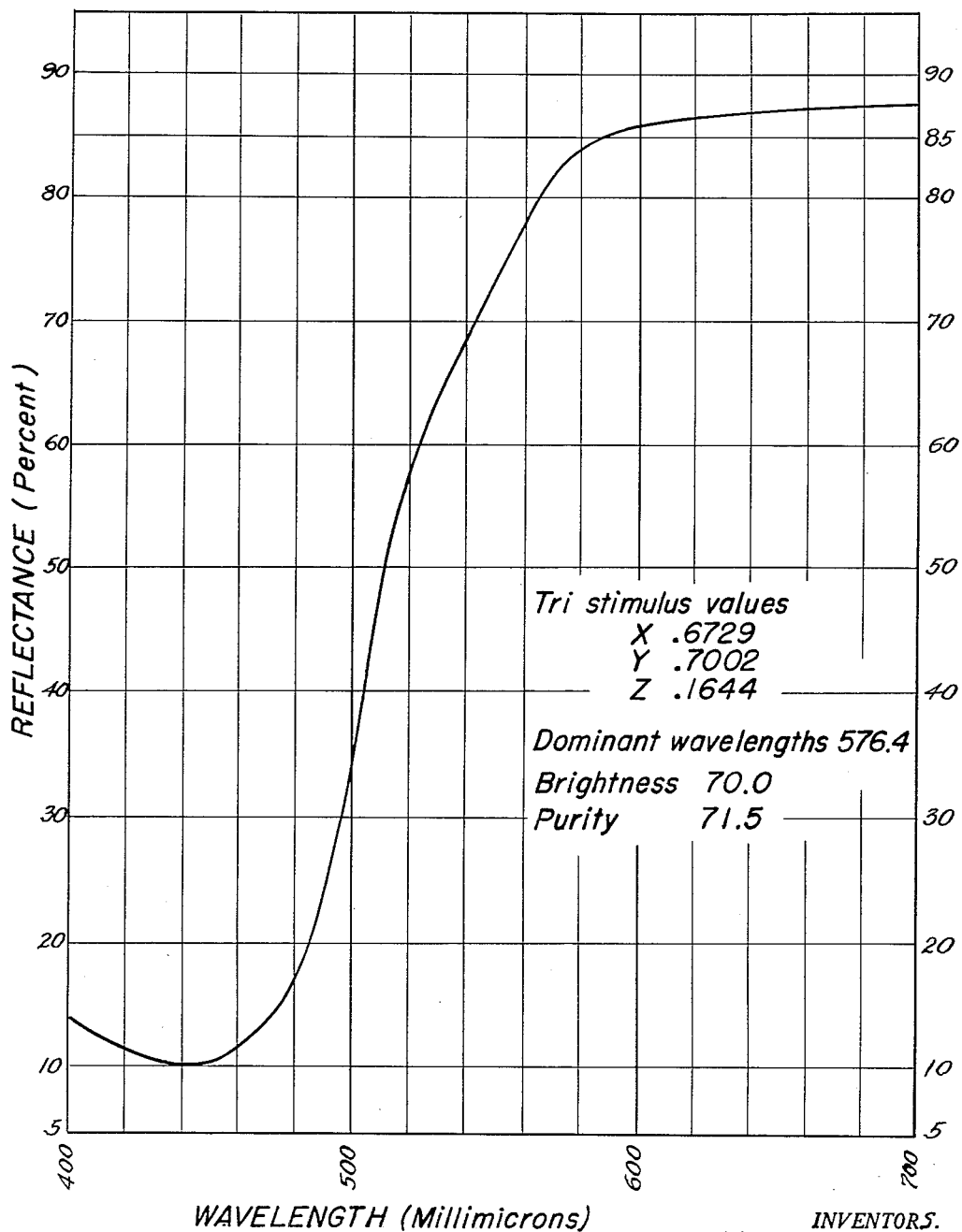

Roy A. Pizzarello, Mount Vernon, N. Y., and Alfred F. Schneid, New Milford, N. J., assignors to Interchemical Corporation, New York, N. Y., a corporation of Ohio Application December 23, 1953, Serial No. 400,084

4 Claims. (Cl. 260—377)

This invention relates to a novel yellow pigment characterized by unusual fastness to light (over 200 hours in a standard "Fadeometer" test) combined with resistance to dry cleaning solvents.

The use of pigments in coloring textiles is historically very old—but such use was of little commercial importance, outside of specialty applications, until pigmented water-in-lacquer emulsion printing pastes were introduced, in about 1938. Since then, the use of pigments for coloring textiles has expanded considerably—and the popularization of "dope dyeing" of synthetics—i. e.—incorporation of color into the spinning solution—has increased the demand for satisfactory pigments.

The principal criteria for pigments for textile coloring are (1) brightness of shade (2) resistance to fading by sun, etc. (3) resistance to soap and (4) resistance to dry cleaning solvents, such as perchloroethylene. In the case of the yellow and red pigments, it has been found necessary to compromise on fade resistance in order to get the other desirable properties. In the yellow field, benzidines have been found to be the most acceptable colors of those generally available; but even the best of them lack light fastness. Consequently, investigators have been actively looking for superior yellow pigments for at least 15 years.

We have discovered a yellow pigment which is characterized by a bright yellow shade, toward the orange, by unusual resistance to fading (200 plus hours in a "Fadeometer," contrasted with about 50 hours for the best benzidine type yellows), by resistance to soap and by resistance to all dry cleaning solvents—in short, by its superior properties for use in textile coloring. This pigment is the reaction product of symmetrical o-phthalyl dichloride with 1 amino anthraquinone in substantially pure form.

It is extremely important that the reaction be carried out between symmetrical o-phthalyl chloride and 1-amino anthraquinone, or the desired pigment will not be obtained. If, for example, the reaction is carried out with phthalic anhydride and phosphorous pentachloride (a method described in German Patent 216,930, published December 11, 1909), the product obtained is a brownish yellow powder with practically no tinctorial value, and valueless as a pigment. This is probably due to the fact that phthalic anhydride reacts with PCl₅ to form the asymetrical dichloride

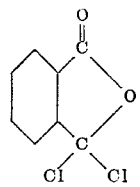

(See Houben-Weyl—Methoden der Organischen Chemie 4th edition—page 469) which converts to the symmetrical form only after prolonged heating—so that the end product is a mixture of a number of materials.

The reaction may be carried out in any inert solvent for the reactants, which boil at a high enough temperature to permit the reaction to proceed. We have used various chlorobenzenes (dichlorobenzenes-trichlorobenzenes, etc.) perchloroethylene, nitrobenzene etc. It should be noted that because of differences in solvent power, the shade of pigment produced varies from solvent to solvent. Because of this, our preferred solvent is nitrobenzene.

Reaction temperature is likewise of importance. Purity of color is lost as the condensation temperature is taken up above about 110° C. While small temperature increments produce only small changes, we prefer to insure maximum brightness of shade by holding the temperature to 110° C. or lower.

The products should be used in approximately theoretical ratios—2 of the amino anthraquinone to 1 mol of the symmetrical phthalyl chloride.

In preparing the pigment, we charge, into a convenient closed reaction vessel provided with a stirrer, 3600 parts by weight of nitrobenzene, 240 parts by weight of 1-amino anthraquinone and obtain solution with stirring. We then add 140 parts symmetrical o-phthalyl dichloride and heat to 110° C. over a period of 1 to 1½ hours, using indirect heat (e. g.—electric heat, oil bath, steam jacket). The batch is held at 105–110° C. for two hours, and air is blown through the batch to vent excess HCl, allowing the temperature to fall to 75° C. during 2 hours. This blowing removes most of the HCl. We then add 1200 parts of methanol (or other low boiling solvent for the nitrobenzene), 10 parts of monoethanol amine (or other convenient alkali) to neutralize the remaining acid, adding more if necessary until the batch is alkaline to litmus.

The pigment is filtered, and washed free of nitrobenzene with methanol (i. e. until the filtrate is colorless). The solvents are recovered in stills—the yield of pigment is about 280 parts by weight.

The resultant pigment is a bright yellow pigment on the orange side, as can be determined from the spectrophotometric curve which comprises the drawing herein. The curve was obtained by dispersing 1 part by weight of the pigment (45%) in 1.2 parts of bodied linseed oil; the resultant paste was tapped out to a transparent film on glass.

As will be noted from the curve, the pigment is a bright yellow with an orange cast. The tristimulus values, as calculated from the curve, are X, Y, Z, X=.6729, Y=.7002, Z=.1644; these yield a dominant wave length of 576.6; a brightness of 70.0 and a purity of 71.5.

Obviously, if the curve were measured on white paper, or in combination with a white fabric, the brightness would be higher; and when used on fabric as a colorant, a very bright yellow color is obtained.

The pigment produced has an average particle size of the order of two microns.

Care must be taken with the raw materials, and the processing equipment, as well as with the reaction conditions, in order to get a substantially pure end product. Thus, if the phthalyl chloride is made from phthalic anhydride and phosphorus pentachloride, or from phthalic anhydride and sulfonyl chloride, the phthalyl chloride must be carefully purified—relatively small quantities of phosphorus anhydride will cause the final product to be dirty, and unsatisfactory as a pigment. Furthermore, it is essential to produce the desired pigment immediately—the product is so very insoluble in the available solvents that there is no satisfactory way to convert the dirty product to a satisfactory clean pigment.

Our new pigment has been found to be satisfactory for both pigment printing and pigment dyeing of textiles with synthetic resin binders, and has been successfully incorporated into cellulose acetate and viscose spinning solutions. It has also been found acceptable for nitrocellulose lacquers for automobiles, and has sufficient resistance for outdoor sign finishes.

We claim:

1. A bright yellow pigment consisting of the condensation product of one mol of symmetrical o-phthalyl dichloride with two mols of 1 amino-anthraquinone, prepared in inert solvent for the reactants and characterized by a dominant wave length of 576, a brightness of 70 and a purity of 71.5, when measured as a transparent tap out on glass of a 45% dispersion of the pigment in bodied linseed oil.

2. The method of producing a bright yellow pigment which comprises condensing, in an inert solvent for the reactants, one mol of symmetrical o-phthalyl chloride with two mols of 1 amino-anthraquinone at a temperature not in excess of 110° C.

3. The method of claim 2, in which the inert solvent is nitrobenzene.

4. The method of claim 2, in which, after the condensation is completed, most of the HCl formed is removed by blowing, and the balance neutralized by alkali, and the precipitated yellow pigment is recovered from the reaction mixture by washing it free of inert solvent with a low boiling, readily volatile solvent for the inert solevnt.

References Cited in the file of this patent

FOREIGN PATENTS

| | | |
|---|---|---|
| 216,980 | Germany | Dec. 11, 1903 |
| 157,342 | Switzerland | Dec. 1, 1932 |
| 633,486 | Great Britain | Dec. 19, 1949 |
| 1,015,379 | France | July 9, 1952 |